US006714942B1

(12) United States Patent
Westcott (10) Patent No.: US 6,714,942 B1
(45) Date of Patent: Mar. 30, 2004

(54) METHOD OF CREATING AND USING A SUB-CLASSED OBJECT THAT SPANS MULTIPLE COMPUTERS IN A NETWORKED COMPUTING SYSTEM

(75) Inventor: Brian A. Westcott, Calgary (CA)

(73) Assignee: E-Volve Incorporated, Calgary (CA)

( * ) Notice: Subject to any disclaimer, the term of this patent is extended or adjusted under 35 U.S.C. 154(b) by 59 days.

(21) Appl. No.: 09/627,250

(22) Filed: Jul. 28, 2000

(51) Int. Cl.[7] .......................... G06F 7/00; G06F 17/00
(52) U.S. Cl. ..................... 707/103 R; 709/315
(58) Field of Search ................. 717/107, 108, 717/143; 345/641; 709/315, 224, 332; 707/103 R, 513; 700/216

(56) References Cited

U.S. PATENT DOCUMENTS

| | | | |
|---|---|---|---|
| 5,398,336 A | * 3/1995 | Tantry et al. | 707/103 R |
| 5,428,792 A | * 6/1995 | Conner et al. | 717/143 |
| 5,481,721 A | * 1/1996 | Serlet et al. | 709/315 |
| 5,613,148 A | 3/1997 | Bezviner et al. | 709/203 |
| 5,701,485 A | * 12/1997 | Guillen et al. | 709/315 |
| 5,764,958 A | 6/1998 | Coskun | 709/315 |
| 5,859,978 A | 1/1999 | Sonderegger et al. | 709/226 |
| 5,893,118 A | 4/1999 | Sonderegger | 707/203 |
| 5,920,404 A | 7/1999 | Weiser | 358/434 |
| 5,933,826 A | 8/1999 | Ferguson | 707/9 |
| 5,982,507 A | 11/1999 | Weiser et al. | 358/438 |
| 5,983,234 A | 11/1999 | Tietjen et al. | 707/103 R |
| 5,987,471 A | 11/1999 | Bodine et al. | 707/103 R |
| 6,016,499 A | 1/2000 | Ferguson | 707/104.1 |

* cited by examiner

*Primary Examiner*—Jean M. Corrielus
*Assistant Examiner*—Gwen Liang
(74) *Attorney, Agent, or Firm*—Myer Dawes Andras & Sherman LLP; Joseph C. Andras

(57) ABSTRACT

A method of deriving a sub-class from a remote objects contained on a remote computer and from local objects contained on a local computer to produce a hierarchy of objects distributed across the local and remote computers. Further disclosed is a method of processing a request message from a calling computer program in a distributed object computing system containing a hierarchy of objects distributed across computers.

4 Claims, 10 Drawing Sheets

POLYMORPHISM EXAMPLE #1

A GENERIC OBJECT
WHERE THE INTERFACE AND IMPLEMENTATION
RESIDE ON A SINGLE COMPUTER

FIG. 1
PRIOR ART

A COMPILED OBJECT THAT IS AN INSTANCE OF A NEW CLASS DERIVED FROM A BASE CLASS
WHERE THE DERIVED CLASS INCLUDES
(1) A NEW MEMBER FUNCTION 4 THAT "OVERRIDES"
THE ORIGINAL MEMBER FUNCTION 4 FROM THE BASE CLASS AND
(2) A NEW MEMBER FUNCTION 5

A GENERALIZED MORPHEUS OBJECT (MO)

FIG. 5

MOST BASIC MORPHEUS OBJECT (MO)

FIG. 6

SEQUENTIAL UP/DOWN PASSAGE OF MESSAGES WITHIN A MORPHEUS OBJECT (MO)

FIG. 7

"Collection" is an important class that is derived from the "MethodGroup" class. An instance of the "Collection" class is a data item (DI) containing a list of local Morpheus objects.

A MORPHEUS OBJECT OF TYPE "COLLECTION" IS A DATA ITEM CONTAINING OTHER MORPHEUS OBJECTS

FIG. 8

WHEN IT RECEIVES A "SELECT" MESSAGE CONTAINING THE NAME OF ONE OF THE MO's IT CONTAINS, THE COLLECTION MO MAKES ITSELF A SUB-CLASS OF THE SELECTED MO

DATA ITEM (DI5)
Type "Remote"

DATA ITEM (DI3)
Type "Remote"

FIG. 14   GetPrice   PriceInPesos

METHOD OF CREATING AND USING A SUB-CLASSED OBJECT THAT SPANS MULTIPLE COMPUTERS IN A NETWORKED COMPUTING SYSTEM

FIELD OF THE INVENTION

The present invention relates generally to object-oriented computer programs using distributed objects and, more particularly, to a distributed object architecture where an object on a local computer may create a sub-class of an object on a remote computer and thereafter function as a combined object by automatically, systematically communicating messages from the sub-class to object in a ripple up, return down fashion.

BACKGROUND OF THE RELATED ART

As stated in background section of U.S. Pat. No. 5,481,721, here paraphrased and embellished, an object is a programming unit that groups together a data structure (instance variables) and the operations (sometimes called member functions, methods, functions, or procedures) that can use or affect the data. Thus, an object consists of data and one or more operations or procedures that can be performed on that data. The joining together of data and operations into a unitary building block is called "encapsulation". In object-oriented programming, operations that can be performed on the data are often referred to as "methods." An object can be instructed to perform one of its operations when it receives a "message". A message is a command or instruction to the object to execute a certain method. It consists of a method selection (name) and arguments that are sent to the object. The message does not instruct the object how to perform the method. It is only necessary to request that the object execute the method.

Object-oriented programming is being brought to the forefront because the widespread adoption of network technologies and standardized communication protocols has provided nearly universal connectivity. The result of such universal connectivity is an immense number of computers that are connected together in local area networks, or Intranets, and a global network of such networks known as the Internet. Universal connectivity exposes users and application programs to vast amounts of data, much of which is unstructured. At the same time, universal connectivity has opened the possibility of using distributed functionality when designing and writing application programs. The encapsulation of data and functionality that is inherent in the object-oriented programming paradigm has resulted in this paradigm being chosen to address the problem of distributed functionality.

There are presently two popular frameworks for distributed object computing: (1) the Distributed Component Object Model (DCOM) supported by Microsoft, and (2) the Common Object Request Broker Architecture (CORBA) supported by a consortium of hardware and software companies called the Object Management Group.

Figure 1:
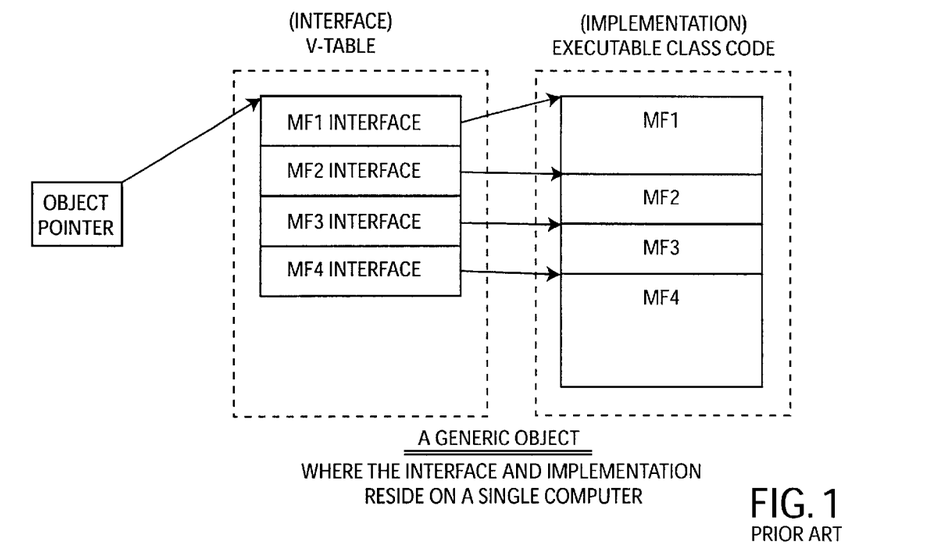
FIG. 1 shows a typical prior art approach to executing an object with an interface table that points to the base address of memory locations containing the executable class code corresponding to member functions.

FIG. 1 shows a typical prior art approach to executing an object. In order to provide flexibility at compile time, the object's "interface" is maintained separately from the object's "implementation." A standard mechanism such as an intermediate table relates the object's interface to the object's implementation. During compilation, the name of each member function is correlated with the corresponding binary code that implements the member function that will be invoked with the intermediate table. The intermediate table is often called a vector table, or "V-table". The implementation consists of executable class code that is written in the developer's language of choice. Generally, because the compiler has to keep track of how the executable class code of each member function manipulates memory stacks, and the like, it is a practical necessity that all of the member functions be written in the same language at the same time. It is not practical, in other words, to provide member functions written in different languages or to modify, enhance (add functionality), or "swap-out" a member function on the fly, much less do so with an object that is distributed across a computer network or across computer languages.

An object is ultimately accessed at run-time by using a pointer to the object. The pointer contains the address of the V-Table that in turn contains more pointers (called "interfaces") to the object's member functions. The sizes of the V-Table and executable class code are fixed when the description of the object is compiled. At runtime, an invocation of a particular member function results, with the help of the V-Table, in the execution of the corresponding code. A member function (e.g. Member Function 3) is called by first obtaining the interface pointer for the $3^{rd}$ interface in the V-Table whose address can be accessed from the object pointer. The interface pointer thus obtained is the memory address of the code within the object that implements Member Function 3. If additional member functions are added to the object at a later time, then the executable class code must be recompiled and the V-table must be recreated. The executable class code implementing the member functions must be modified to include the additional member function. The V-Table must be modified to reflect the new sizes and starting locations of the member function code. When generating code for a program that will use the object, the compiler must be aware of the location within the V-Table (but not in the object itself) of the member function that is being called.

There are certain standard object functions that are desirable in an an object-oriented language:

"Function Name Overloading"

Function Name Overloading refers to situation where two member functions have the same name, but are differentiated from one another by the number of parameters, type of parameters, or both. In FIG. 1, for example, member function 2 and member function 3 might have the same name, but different implementations. When a compiler is generating a call to that name, the compiler will have to use the parameter list for each member function of that name to determine which V-Table entry to hardcode into the caller's code. In other words, the compiler must be aware of the location within the V-Table of the member function that is being called, and of the parameters that are used by each of the member functions when it is compiling the program that will use the object.

Inheritance

Figure 2:
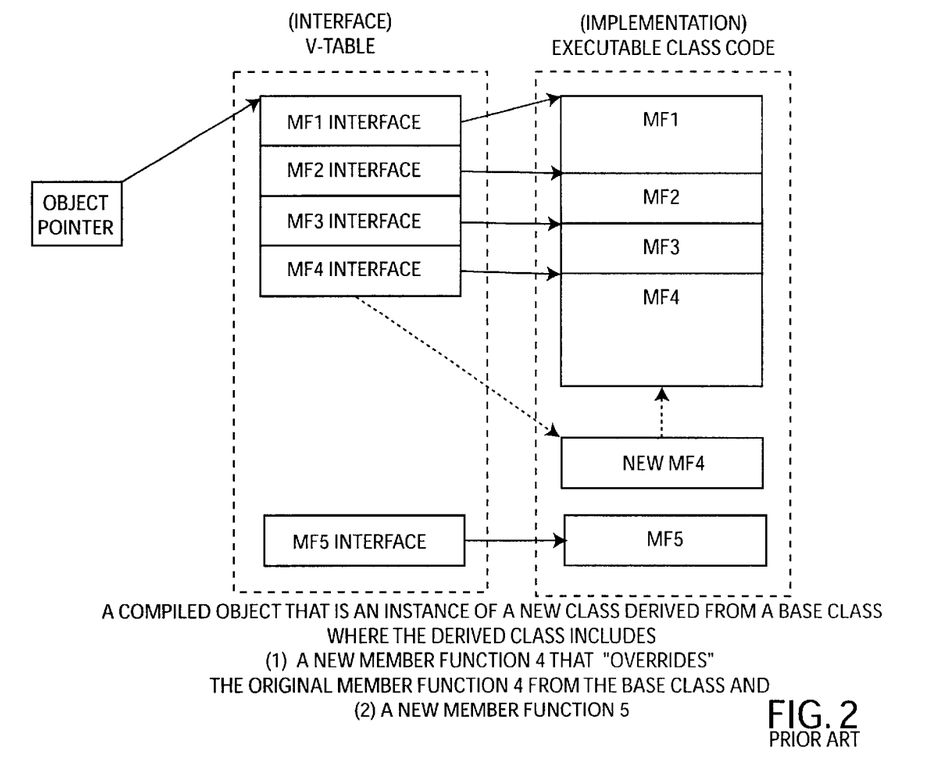
FIG. 2 figuratively shows how a derived class may be created that adds a new version of Member Function 4 that overrides the version of Member Function 4 from the base class, and adds new Member Function 5 not even found in the base class.

Inheritance is a mechanism for creating a new class from an existing class. The existing class is called the base class and the new class is called the derived class. In FIG. 2, a derived class was created that contains a new version of Member Function 4, and a new function, Member Function 5. The new version of Member Function 4 is said to override the version of Member Function 4 that exists in the base class. When creating code for the derived class, the compiler will create new executable code and a new interface table that contains the code and interfaces for both the base class and the derived class. The base class itself, however, will not have to be re-compiled as long as its binary representation and interface description are available.

If a second derived class is created from the same base class, and this derived class also overrides Member Function 4, then there are now two derived classes, each with its own version of Member Function 4. Note that the first three entries in the V-Tables for the two derived classes would be the same, while the entry in the V-Table for Member Function 4 will be in the same relative location in the V-Tables. A caller calling a member function can use the same method invocation for Member Function 4 for either of the derived classes, but the actual code executed will depend on which derived class is being used. The ability for different classes that are derived from the save base class to respond to the same method invocation is called polymorphism.

Prior distributed object architectures require some method of remote invocation in order to permit one computer (client) to interact with an object located on another computer (server). The known distributed object architectures are overly complex because the objected-oriented languages like C++ have their roots in conventional programming languages like C. In particular, the existing distributed object architectures assume that what you really want to do is run a program some place else just as if you ran it on your own system. If you adopt this assumption, then you have to make sure that everything that can be done on the remote system can be done on own system. In other words, you have to make sure that a remote member function can run on a local computer just like it was a local member function.

At least one of these prior art approaches uses a byte stream to communicate between client and server. Nonetheless, all of the distributed component architectures known to this inventor offer complicated solutions to providing remote execution rather than elegant solutions to simply get the data from a remote source.

Static Remote Object Invocation

Figure 3:
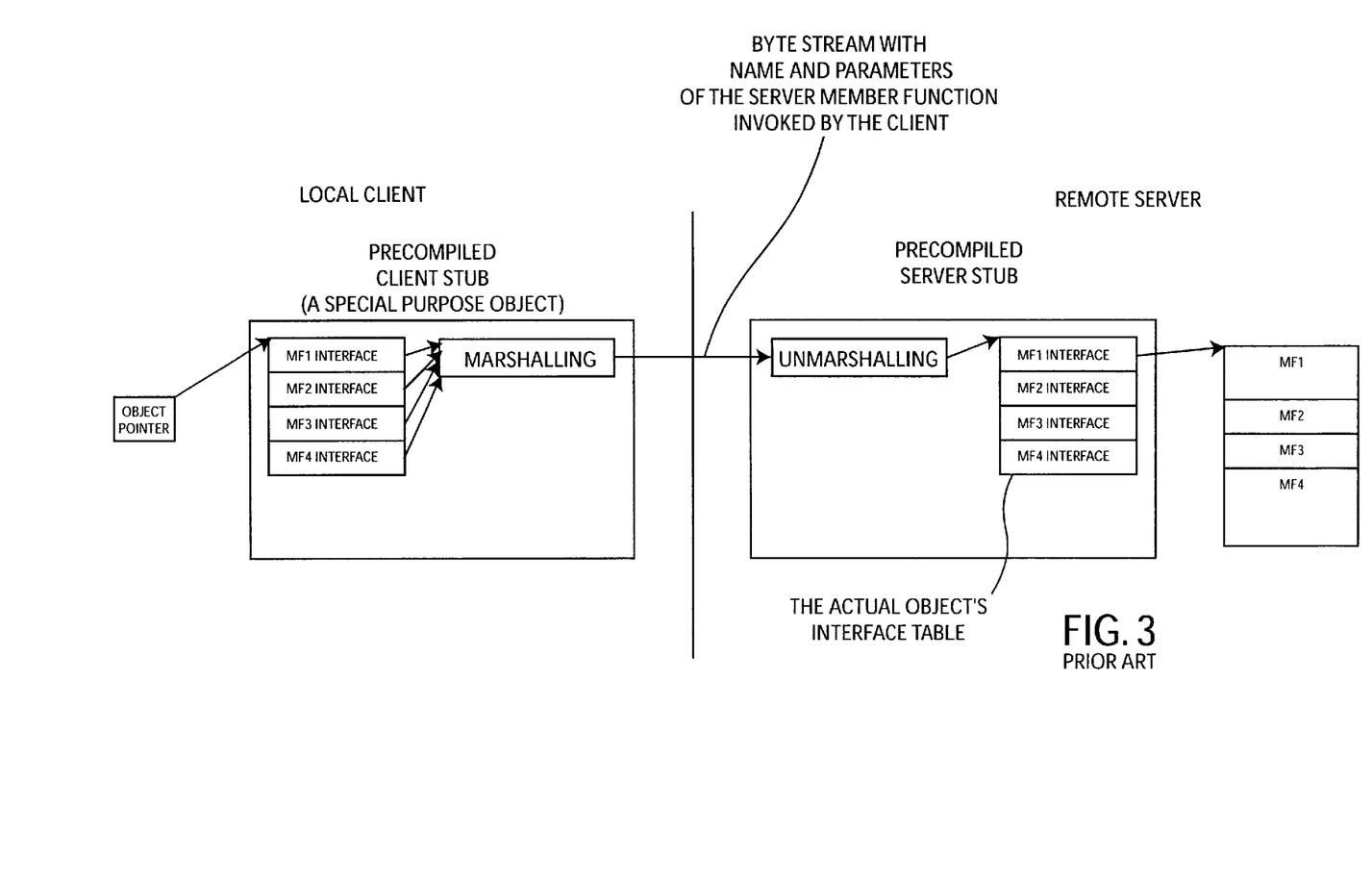
FIG. 3 shows a prior art approach to static invocation where a "client stub" having the same interfaces as the remote object creates a byte stream that contains the identity of the remote member function and necessary parameters, the byte stream being transferred via some communications protocol to the server computer where it is converted back in order to execute the remote member function with the associated parameters.

FIG. 3 relates to a typical static invocation where a "client stub" (discussed below) is compiled such that the available interfaces are fixed at the time of compilation. This is the known architecture that relies on a byte stream.

Static invocation involves the creation of a client stub on the client computer that has the same interfaces as the remote object. The client stub is an object in its own right and it will support the standard mechanism for relating the interface of an object to the implementation of the object (e.g. a V-Table). When the client invokes a particular member function in the client stub, the stub will participate in a process called marshalling and create a byte stream that contains an identifier of the function and the data associated with all of the function's required parameters. If the server computer has a different architecture than the client computer, the marshalling process may also convert the data making up the byte stream into some standard format (e.g. modifying the byte order, and so on).

The byte stream is then transferred via some communications protocol to the server computer where, as suggested by the right side of FIG. 3, it is converted back into the member function and associated parameters of the server object. The member function on the server object is then called in whatever standard way objects are invoked and called on the server computer. Note that the language in which the remote server object is written does not have to be the same as the language in which the client object is written because the marshalling converts member function calls and data into a language and computer architecture standard format.

Dynamic Remote Object Invocation

In dynamic invocation, no client stub is required. Instead, the client program can determine the member functions and parameters of the remote object dynamically, and then call the marshalling code directly to create the byte stream and send it to the server side stub.

Notwithstanding the industry's efforts to support and develop distributed object applications such as DCOM and CORBA, it remains difficult to create and use objects across computer hardware and computer language boundaries. There remains a need, therefore, for an improved method of creating and using a sub-classed object that spans multiple computers in a networked computing system

SUMMARY OF THE INVENTION

In a first aspect, the invention resides in a method of processing a request message from a calling computer program in a distributed object computing system containing a hierarchy of objects distributed across computers, said method comprising the steps of: successively providing the request message to a next-highest object beginning with a lowest-most object and progressing toward a highest-most object; and checking each object provided with the request message to determine if it is to respond to the request message; and, if it is to respond, creating a response message; and returning the response message to the calling computer program by successively providing the response message to a next-lowest object until it reaches the lowest-most object.

In a second aspect, the invention resides in a method of deriving a sub-class from a remote objects contained on a remote computer and from local objects contained on a local computer to produce a hierarchy of objects distributed across the local and remote computers, said method comprising the steps of: providing an object table with a data structure for holding a plurality of object records that point to target objects; and populating the object table beginning with a lowest-most object corresponding to an object on the local computer and ending with a highest-most object that contains a pointer to the lowest most object in an object table on the remote computer so that logically the two object tables act as a single object table.

BRIEF DESCRIPTION OF THE DRAWINGS

The just summarized invention can be best understood with reference to the following description taken in view of the drawings of which.

DETAILED DESCRIPTION OF THE PREFERRED EMBODIMENT

The preferred embodiment of this invention involves "Morpheus Servers" that can run on my kinds of computers and operating systems and, in each case, includes an "engine" that manages a structured collection of "Morpheus Objects". The prototype server runs under the Microsoft Windows platform, but it is anticipated that the server application will be written for other systems such as UNIX and Macintosh. The prototype server 50 was written in C++, but any suitable programming language would suffice.

Figure 4:
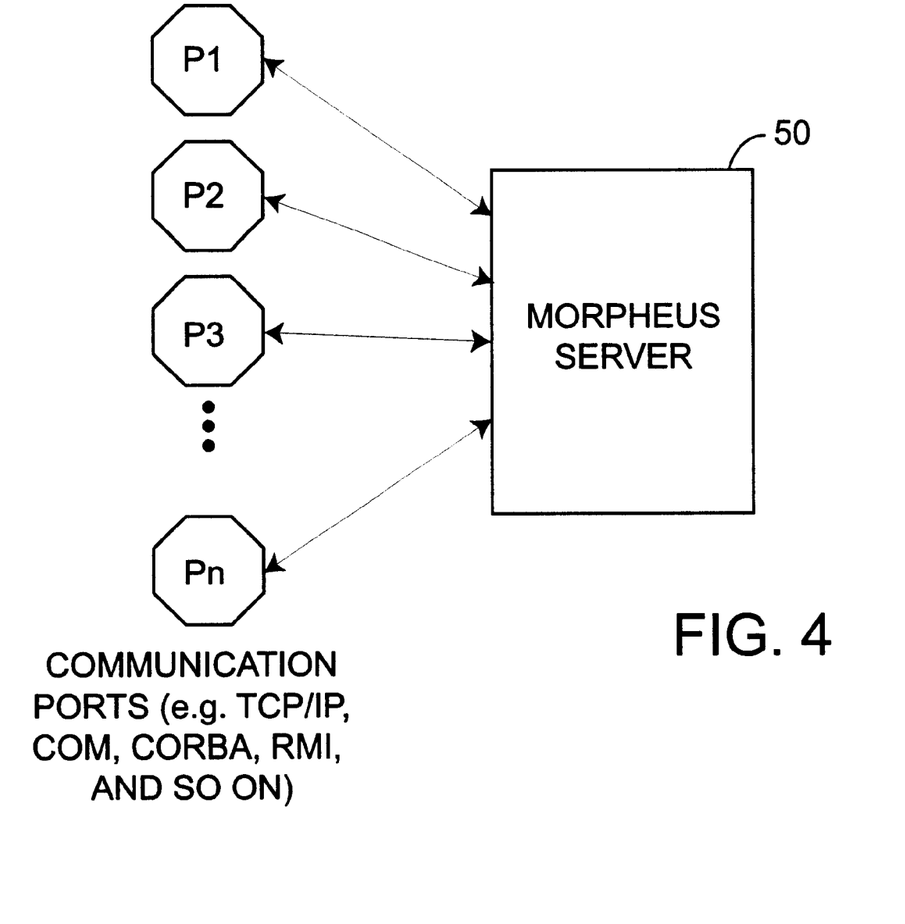
FIG. 4 figuratively illustrates a single Morpheus Server 50 that communicates with local applications or with other Morpheus Servers via one or more ports P1, P2, P3, Pn.

FIG. 4 figuratively illustrates a single Morpheus Server 50 that communicates with local applications or with other Morpheus Servers via one or more ports P1, P2, P3, Pn. A port is a multi-threaded access point that can use shared memory and includes such well-known protocols as Transport Control Protocol/Internet Protocol (TCP/IP), Distributed Component Object Model (DCOM), Common Object Request Broker Architecture (CORBA), Remote Method Invocation (RMI), or any other interface protocol that supports communications betweens processes on the same or different computers. An application program that wants to communicate with any of the objects managed by the server will use one or more of the ports. The application will "select" the object that it wants to use by giving its name to the server. The application may then send and receive "messages" between itself and the selected object.

Figure 5:
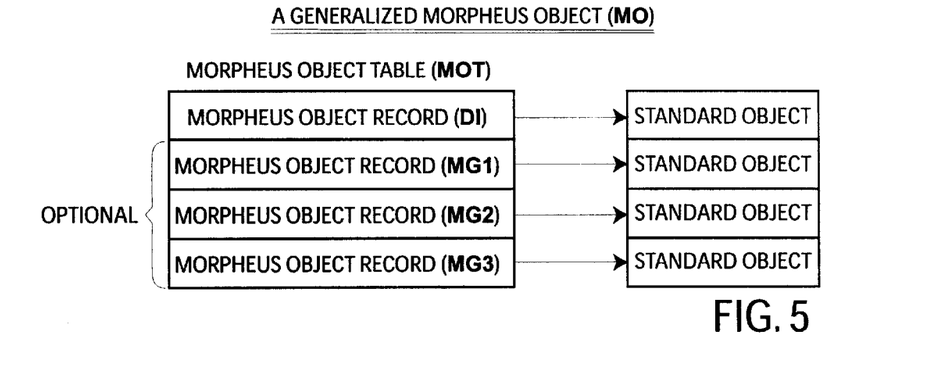
FIG. 5 shows a generalized "Morpheus Object" according to this invention.

FIG. 5 illustrates a generalized "Morpheus Object" according to this invention. Throughout this application, a Morpheus Object will often be called just "MO" for short. As shown, the MO includes a Morpheus Object Table (MOT) consisting of one or more Morpheus Object Records (MOR). Each MOR generally contains the address of a standard object and the persistent data for that object. The inventor's executable class code was written in C++, but any language would suffice. The standard C++ objects associated with each MOR contribute to the data and the operations associated with the MO.

Figure 6:
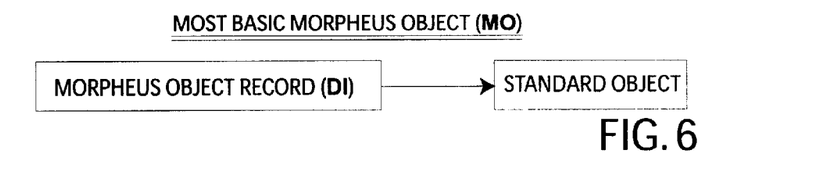
FIG. 6 shows the most basic Morpheus Object that contains just one Morpheus Object Record called a Data Item (DI).

As shown by FIG. 6, the simplest, most basic MO contains just one MOR called a Data Item (DI). A Data Item, therefore, may be regarded as the fundamental programmable unit. The DI points to the object that is responsible for managing whatever data is associated with the MO (e.g. records in a database accessed through the Open Database Connectivity or ODBC protocol).

Morpheus currently supports eleven different "property" types. In particular, every individual piece of data is treated as a property that has a name, a type, and a value, or "NTV-tuple", such as:

| Name | Type | Value |
|---|---|---|
| Account balance | Floating point number | $101.99 |
| Items purchased | Integer | 5 |
| Name | String | John Doe |
| ID | Byte string | Encrypted Visa |
| Account Record | Record in a database | Account balance |

As shown by FIG. 5, however, it is possible to derive a subclass to the most-basic DI-Only MO by dynamically adding one or more Methods Groups (MGs) to the Morpheus Object Table (MOT). As a simple example, given the ability to modify a "Price" property that is in US dollars with a Method Group that converts the US price to French francs. What is not clear from FIG. 5, but will become clearer from subsequent figures, is that a Morpheus Object can span computers across the globe such that a local Method Group can act upon a remote property. As such, a consumer in France might associate a remote "Price" property in US dollars with a local conversion method so that his client application automatically reports the price in French francs.

The Morpheus Object Table (MOT) is similar to the conventional V-Table of FIG. 1. In both tables, the member functions for the base class are defined first and those for derived classes are defined in the order of inheritance. Both tables act as pointers to member functions within the object.

In a V-Table, however, the relative locations of a particular method are fixed. If a program is calling the third method, then the compiler will create code that will transfer control to the address given in the third entry in the V-Table. If a new method is inserted, then the program using the V-Table must be recompiled in order to change the relative locations of the methods. In a MO, by contrast, the message is always passed to the lowest object in the MOT and then possibly passed upward. If a new method is inserted (a Method Group), the calling program does not have to be changed because the message still starts with the lowest object in the MOT. Another difference is that a V-Table entry defines only one member function whereas the object associated with each Morpheus Object Record (MOR) may contribute one or more member functions to the Morpheus Object (MO). Another difference is that two or more MOTs can be combined through the use of special types of Data Items known as (1) collections, (2) proxies and (3) remotes:

(1) Collections

Figure 8:
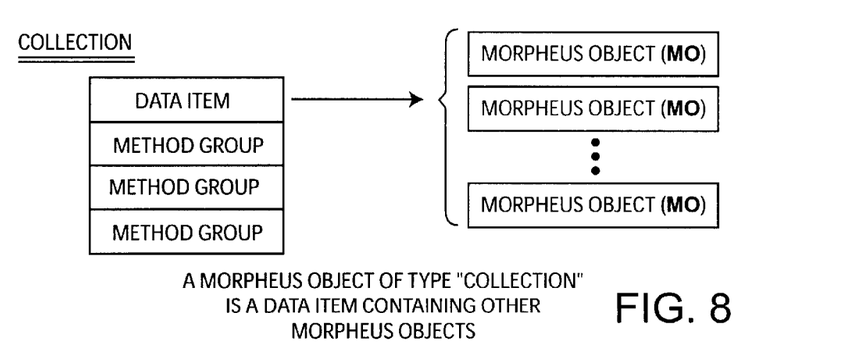
FIG. 8 shows a Morpheus Object (MO) known as a collection, its Data Item being a list of other Morpheus Objects (MOs)

FIG. 8 shows a collection, which is a Morpheus Object (MO) whose Data Item is a list of other Morpheus Objects (MOs). Because a Collection is a MO, the DI of one Collection can include yet another Collection. The target MO's of a collection MO are always local MOs.

Figure 9:
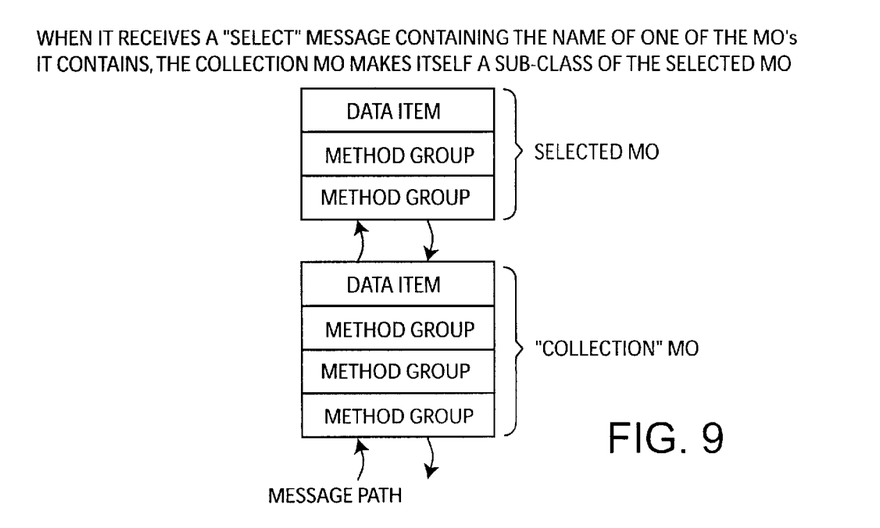
FIG. 9 shows that when a collection receives a "Select" message containing the name of one of the MOs that it contains, the collection makes itself a sub-class of the selected MO.

FIG. 9 shows that when a collection receives a "Select" message containing the name of one of the MOs that it contains, the collection makes itself a sub-class of the selected MO.

(2) Proxies

A proxy is a Morpheus Object whose data item doesn't point to a collection of Morpheus Objects, but rather points to just one Morpheus Object or target MO in a one-to-one relationship. The target MO of a proxy MO can be any type of MO.

(3) Remotes

A remote is a Morpheus Object is essentially the same as a collection Morpheus Object except that the target MO on the remote computer is always a collection—a remote collection.

In order to implement the unique distributed object communication system according to a preferred embodiment of this invention, the objects on one Morpheus Server 50 may communicate with objects on another remote Morpheus Server (not shown) by using one of the network transport ports (e.g. a TCP/IP port). In the past, there has been a need for an Interface Definition Language (IDL) that provides a fixed description of the remote object's interfaces so that the remote object can be invoke locally and then manipulated across the world behind the scenes, or for some sort of a central control system that manages the exchange of information between servers and clients. With the preferred embodiment of this invention, however, neither are required. After establishing communication with the remote server managing the remote object required by a local object, the local server exchanges string-based messages with that remote object in a client/server fashion. As a result, Method Groups can be added to the client object to enhance of modify the information returned from the server object without having to notify or alter the server object.

Morpheus Objects (MO) preferably follow a defined standard so that the entire system is flexible in terms of permitting the member functions to be written in different languages, in terms of the member functions being able to reside on different computers, and in terms of having not to recompile the class code to create or modify a derived class. In the preferred embodiment, all of the Data Items and Method groups are derived from a single base class that defines these five "virtual" or "abstract" member functions:

1) New—called when the object is first created
2) Open—called once when an existing object is instantiated
3) Close—called once when the object is being closed
4) Edit persistent Data—allows a program to examine or modify the data associated with the object (a DI or a MG)
5) ProcessMessage—called automatically whenever a Morpheus Message is received. This is similar to calling a member function in a standard object. When a Morpheus Object receives a Morpheus Message, it can either handle it (return data and completion codes to the sender) or it can pass the message "up" to the Morpheus Object Record (MOR) next highest in the Morpheus Object Table (MOT).

Morpheus Message

Figure 7:
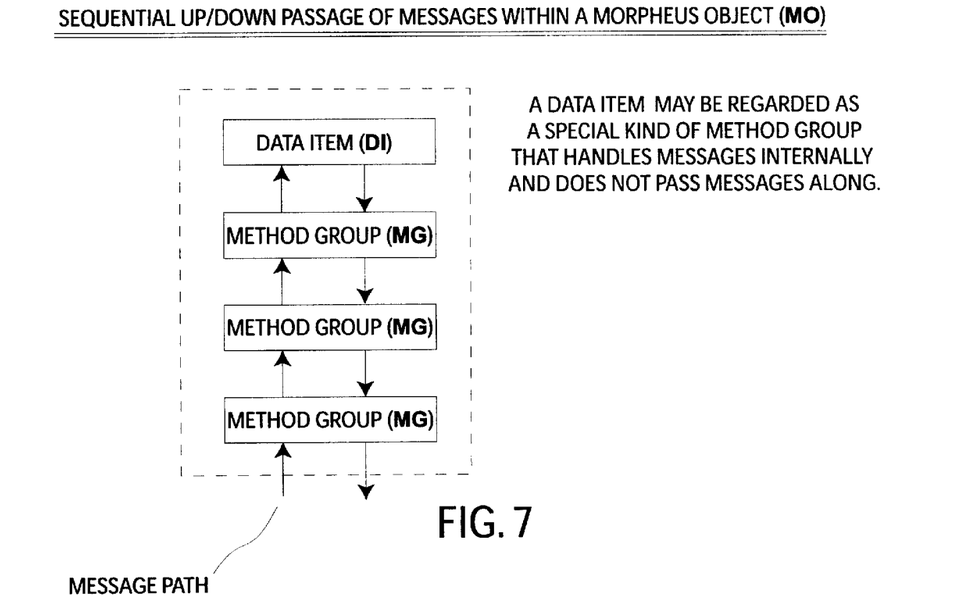
FIG. 7 shows how communication within a Morpheus Object is accomplished with a "Morpheus Message" that is initially provided to the lowest-most object and then successively passed to the next highest object until such time as an object elects to act on the message and provide the results in a return message or until the message reaches the highest-level Data Item.

As suggested by FIG. 7, all communications within a Morpheus Object (MO) are accomplished by sending and receiving "Morpheus Messages." A Morpheus Message is superficially similar to the byte stream of FIG. 3 that is used for marshalling calls to remote objects in that both contain an identifier of a member function in the object that is to be executed, along with the data required by the member function. In Morpheus, however, no effort is made to "unmarshall" a byte stream in order to invoke a particular object requested by the client. Instead, the Morpheus Message is uniquely passed from Morpheus Object to Morpheus Object in a ripple up, return down fashion—across computer and language related boundaries. In particular, each Morpheus Object will "unserialize" or parse the message, determine what if anything it should do with the message, take some action in response to the message if appropriate, reserialize it in case it is necessary to send it on across any language or computer boundaries, and then pass the message to the next Morpheus Object.

Figure 10:
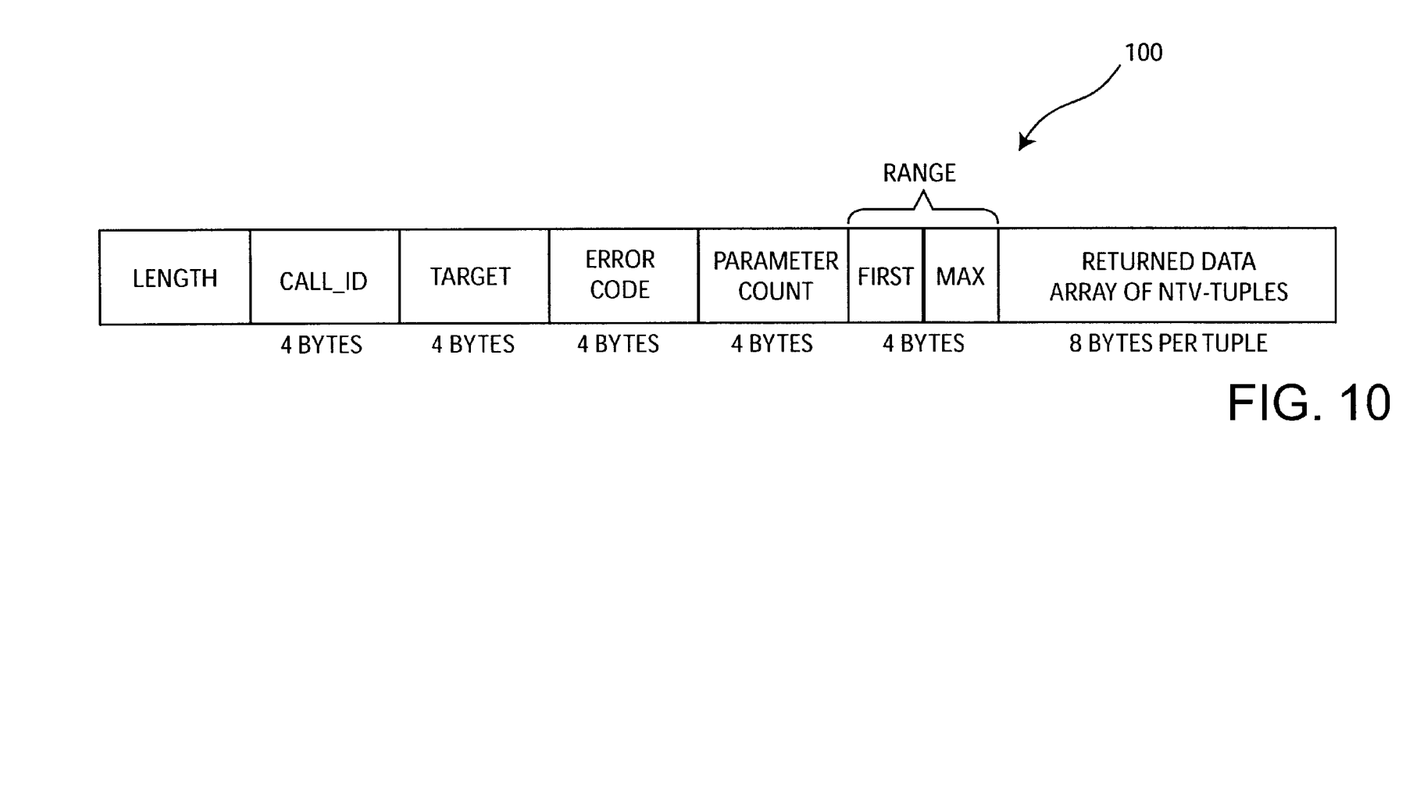
FIG. 10 shows that the preferred structure of a Morpheus Message 100.

FIG. 10 shows that the preferred structure of a Morpheus Message 100 contains the following fields:

Length—indicates the size of all fields×4 bytes+ Parameter Count×size of the tuples+length of byte array (if present);

Call ID—defines the type of message or, equivalently speaking, what method is to be invoked. At present, there are six values that might originate from an external client including: (1) Select; (2) ShowItems; (3) AddItems, (4) AddMethodGroup; (5) DeleteMethodGroup, and (6) EditPersistentData.

Target—identifies the base class, i.e. the most senior superclass. Target is empty in the client's message, but the return message contains the base class owing to the "Selection" process;

Error Code—returns an indicate of an error condition, if any;

Parameter Count—identifies how many name, type, value (NTV)—tuples are in the message (0 to ∞);

Range—controls and constrains the return of data if the Call-ID is ShowItems and the range of records to be updated if the Call-ID is AddItems. For example, "First" may be used by the client to pick up where it previously left off and "Max" may be used to provide some advance constraint on a ShowItems message directed to a database that may have too many records; and Returned Data—contains the returned data in one or more NTV-tuples.

All of the data is encoded in the message 100 in the form of a "name, type and value" first described above with regard to "properties." When the Message 100 arrives and the MO's "ProcessMessage" function is called, the Morpheus Object will use the Call-ID and the NTV data to decide whether it wants to execute the internal function whose ID is encoded in the message. If it does, then it can extract any data that is required for execution from the remainder of the Message 100.

Sequential Bottom-to-Top Instantiation of Objects Across Computer Boundaries

The communication process generally begins with the "selection" process where the Call_ID of the Morpheus Message 100 (FIG. 10) is set to the ID for "select". There will be at least one NTV tuple contained in the message that will consist of a pathname that consists of a succession of collections in a hierarchy of collections that are to be traversed in order to select the last name in the path (the target). When the select is complete then the MO will consist of a base class defined by the MO of the target, with the MOT's of all of the collections in the path being sub-classes. In the preferred embodiment, another NTV-tuple will contain security information that describes the identity and rights of the program requesting the selection.

In Morpheus, after the "Selection" process is completed, the system has sequentially instantiated an object belonging to a completely derived class that may transcend computer boundaries, from the bottom up, and the object is now ready to function in a ripple up, return down fashion.

Through this unique passing of the Morpheus Message 100 from MO to MO, it is possible to implement the functionality that is frequently desired in an object-oriented language:

Function Name Overloading

Function Name Overloading is accomplished in a Morpheus Object by attaching Method Groups (MGs) to the Morpheus Object that will respond to a particular internal Function ID in a Morpheus Message provided that the appropriate NTV-tuples are present in the message.

Inheritance

Inheritance in a Morpheus Object is achieved by adding Method Groups (MGs) to the object. The internal member functions in the base object are accessed when the Method Group passes a Morpheus Message to the base class's "ProcessMessage" function. Similarly, an internal member function in the base class can be overridden when a Method Group intercepts a Morpheus Message containing the call and handles it itself.

Polymorphism

Figure 11:
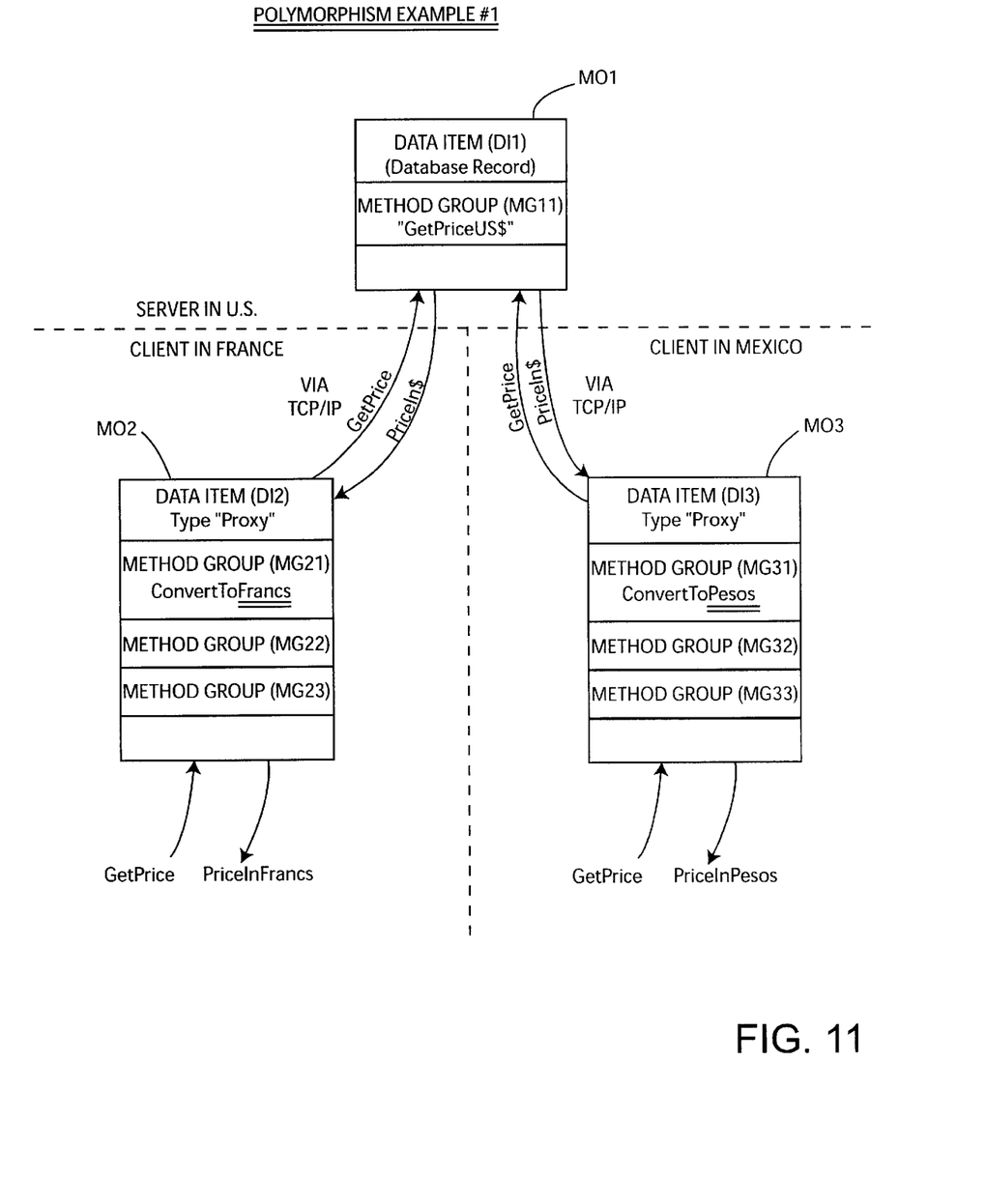
FIG. 11 illustrates polymorphism using Data Items of type "proxy"
Figure 12:
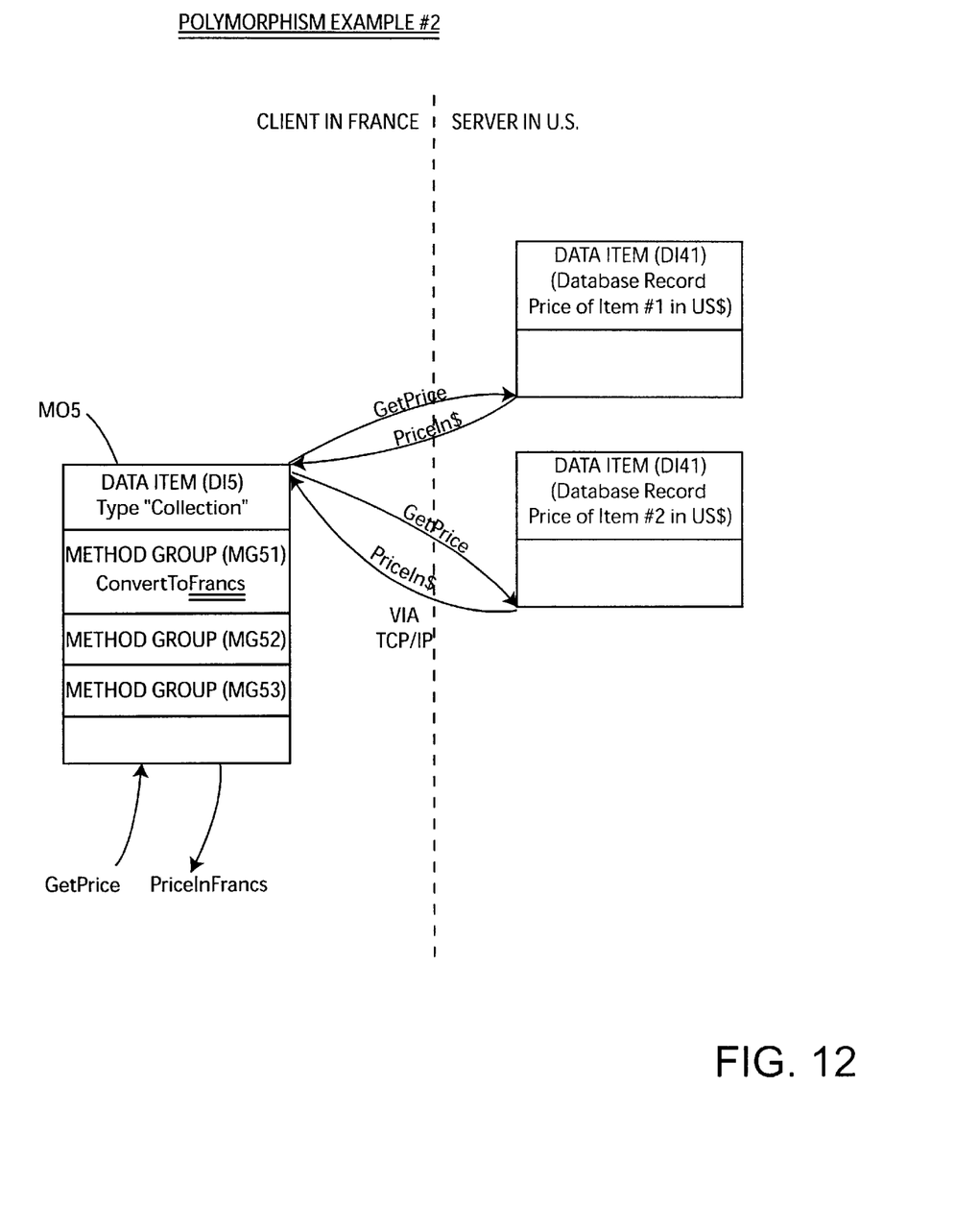
FIG. 12 illustrates polymorphism using Data Items of type "collection" rather than of type "proxy"
Figure 13:
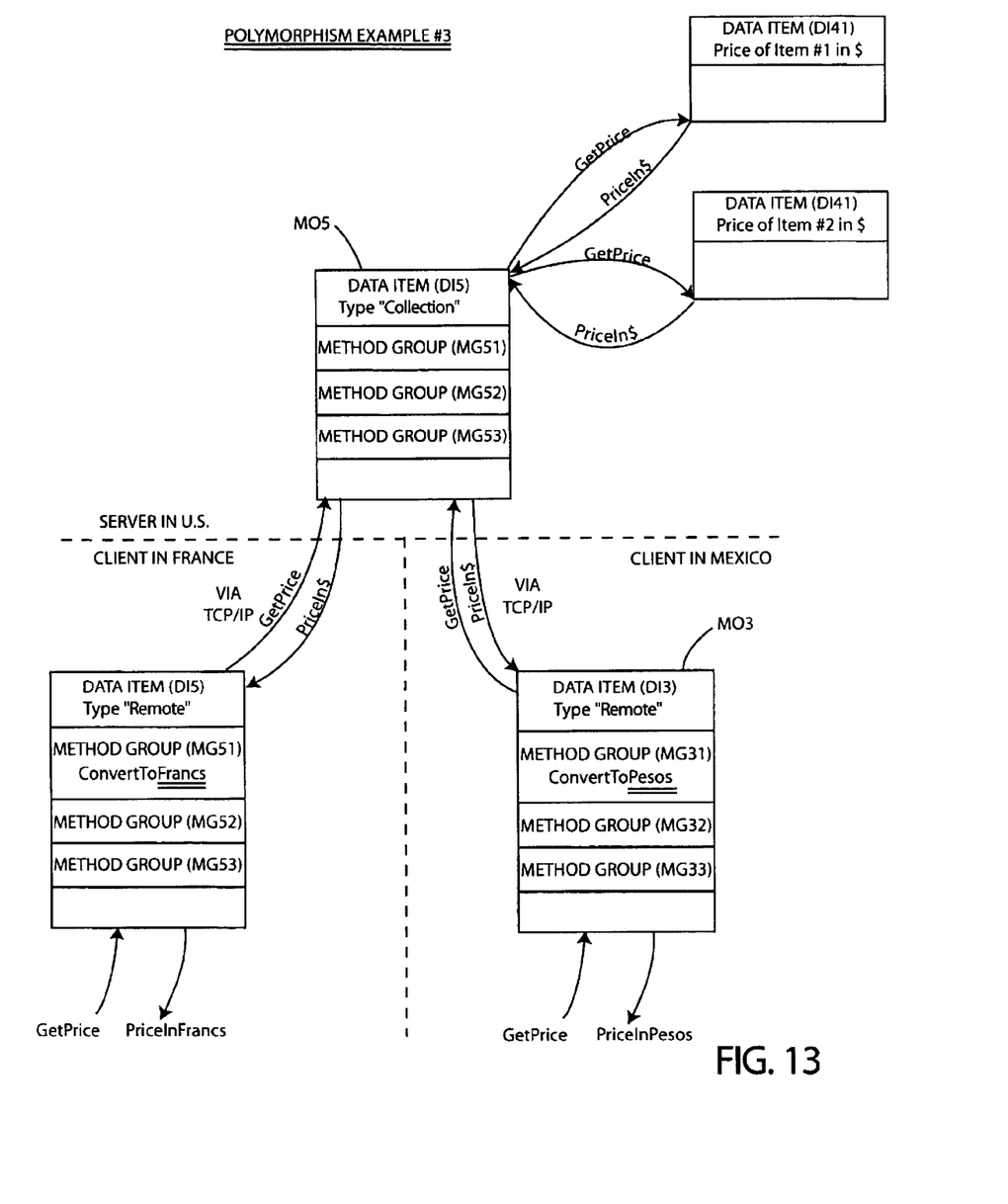
FIG. 13 illustrate polymorphism using Data Items of type "remote"

As shown by exemplary FIGS. 11, 12 and 13 that are directed to a simple pricing hypothetical, polymorphism can be implemented in a variety of ways according to this invention using proxy MOs, collection MOs, and remote MOs.

FIG. 11 illustrates polymorphism using Data Items of type "proxy." A Morpheus Object whose Data Item is of type "proxy" (not to be confused with proxies for distributed objects) can be used to create polymorphic subclasses that can variably respond to a message containing a function call, as suitably desired. A proxy MO is a sub-class of the target MO and it takes on the type of its target (i.e., if the target MO is a collection, then the proxy MO is also a collection). Here, the proxy MOs take on the Data Item type that serves at their target.

FIG. 11, in more detail, shows a Morpheus Object MO1 with a Data Item DI1 that returns the price of an item in US$ when it receives a Morpheus Messsage that contains the internal member function call "GetPrice." A client in France can derive a sub-class M01, M02 by creating a Morpheus Object whose Data Item DI2 is of type "proxy." A proxy data item has the affect of appending Method Groups MG21, MG22, MG23, and so on, to those of MO1. Now, let Method Group MG21 be a script that converts US$ to French francs. When the same message as was sent to MO1 is sent to MO2 instead, then "GetPrice" returns the value of the item in French francs. Similarly, if Data Item DI3 is a proxy and MG31 is a script that converts US$ to Mexican pesos, then a client in Mexico can derive a sub-class M01, M03 and when the same message as was sent to the MO1 is sent to MO3 instead, then "GetPrice" returns the value of the item in pesos.

FIG. 12 shows a second example of polymorphism where the French client uses a Morpheus Object that similarly contains a Method Group that converts US$ to French franks, but now has a Data Item of type "collection" rather than of type "proxy." Here, the target MOs of the collection are Data Items located on a remote server.

FIG. 13 shows a third example of polymorphism wherein a client in France, and a client in Mexico, use a Morpheus Object of datatype "remote." A remote MO is the same as a proxy MO except that the target MO on the remote computer is always a collection. As shown in the FIG. 13, the collection in turn has target MOs that are Data Items on the server computer.

Collections

A "Collection" is a type of Data Item (DI). The data managed by this type of Data Item consists of a set of zero or more Morpheus Objects (MOs). A Morpheus Object (MO) whose Data Item (DI) is a Collection is called a collection. The effect of placing Morpheus Objects (MOs) into a collection is that the Method Groups associated with the collection are appended to all of the Morpheus Objects in the collection. As an example, if MO2 is a collection that contains MO1 as well as other MOs that also returned prices in US$, then the Method Groups MG21 would convert the prices to francs for all MOs in the collection.

Putting It All Together

Figure 14:
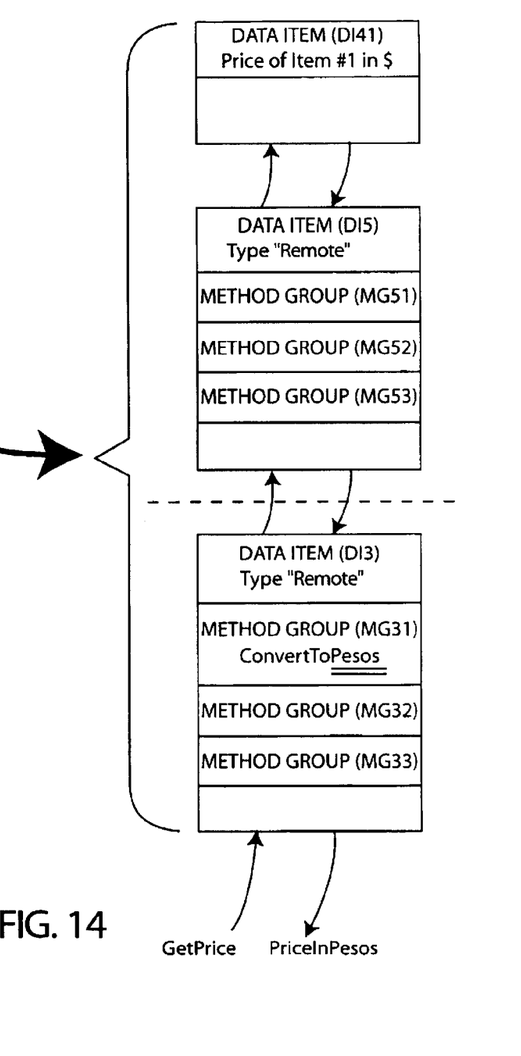
FIG. 14 illustrates how the entire hierarchy of objects created by the Mexican client of FIG. 13 can be regarded as being built bottom-up.

FIG. 14 illustrates how the entire class hierarchy created by the Mexican client of FIG. 13 can be regarded as being built bottom-up. Notice that the ripple-up, return-down functionality of the entire subclass-chain making up this class is readily apparent. In particular, when the client applications requests the price by sending a Morpheus Message with the ID for the internal function "GetPrice" ID encoded in the message. The message is received, parsed, and acted upon or passed up by each MO in the class, even across computer boundaries as represented by the dashed line where a TCP/IP connection exists. Ultimately, the GetPrice call is passed to the Data Item on the U.S. server that contains the price of item #1. The message is now returned from MO to MO, moving from top to bottom. At one point, the return message is passed down to the Method Group that contains the script convert to pesos. Ultimately, the price in pesos is returned to the calling application.

I claim:

1. A method of creating a derived sub-class from remote sub-classes contained on a remote computer and from local sub-classes contained on a local computer to produce a hierarchy of sub-classes distributed across the local and remote computers, said method comprising the steps of:

providing a local pointer table with a data structure for holding a plurality of records that point to target member functions;

providing a remote pointer table with a data structure for holding a plurality of records that point to target member functions; and interconnecting a highest-most sub-class in the local pointer table with a lowest-most sub-class in the remote pointer table wherein the interconnecting step is accomplished by passing a request message from sub-class to sub-class according to the pointer tables, starting with a lowest-most sub-class in the local pointer table and progressing toward a highest-most sub-class in the remote pointer table until a sub-class responds to the request message.

2. The method of claim 1 wherein the steps of passing the request message to a next-highest sub-class and a next-lowest sub-class are accomplished at least in part over a network.

3. The method of claim 1 wherein the request message is a serialized byte stream that transcends computer systems.

4. The method of claim 1 wherein the sub-classes are written in at least two different programming languages.

* * * * *